INVENTORS:
Roderic B. Perkins, Jr.
Robert G. Weisz
BY
ATTORNEY 3,161,620
REACTION OF HYDROCARBON RESINS WITH MALEIC ANHYDRIDE
Roderic B. Perkins, Jr., Highland, Ind., and Robert G. Weisz, Park Forest, Ill., assignors to Standard Oil Company, Chicago, Ill., a corporation of Indiana
Filed Dec. 16, 1960, Ser. No. 76,199
2 Claims. (Cl. 260—78.4)

This invention relates to improved synthetic resins and particularly improved synthetic hydrocarbon resins. More particularly, the invention relates to the improvement of polymers produced from unsaturated hydrocarbon fractions by modification of such polymers with maleic anhydride.

The use of hydrocarbon resins in formulations has been quite extensively accepted by manufacturers of paints, varnishes and fast drying inks. Though these resins offer the advantage of economy in that they can be used as substitutes for all or a portion of the more expensive natural or synthetic resins, they do have a number of drawbacks when used in such formulations. Such drawbacks are instability of the finished product, lack of film durability, and discoloration of the aged coating.

We have found that the properties of hydrocarbon resins produced from a fraction of the condensates obtained in the high temperature pyrolysis of normally gaseous hydrocarbons can be greatly improved in regard to suitability of the resins for use in surface coatings and heat-set printing inks if such resins are modified with maleic anhydride. While formation of adducts of maleic anhydride and resins has been known via the Diels-Alder condensation reaction, this condensation reaction is specific to conjugated double bonds in the resins. Thus, this reaction is not applicable to unsaturated hydrocarbon resins having little, if any, conjugated double bonds. This is the case with hydrocarbon resins produced from condensates obtained in the pyrolysis of normally gaseous hydrocarbons. Extensive efforts to modify these inexpensive hydrocarbon resins with maleic anhydride by the Diels-Alder condensation reaction have proved to be unsuccessful.

We have now discovered that unsaturated hydrocarbon resins produced from condensates obtained from the high temperature pyrolysis of normally gaseous hydrocarbons can be successfully modified with maleic anhydride by the use of proper reaction conditions and a free radical initiator such as a peroxide catalyst. One of the desirable properties of the maleic anhydride-modified resin is that it have a high viscosity when mixed with a suitable solvent. In addition, it should have an acid number of at least 10 in order that it will be useful in paint formulations.

The method of producing hydrocarbon resins which can be modified successfully with maleic anhydride by the use of our invention is by thermal polymerization of an unsaturated hydrocarbon condensate product obtained from the high temperature pyrolysis of normally gaseous hydrocarbons.

Referring to the drawings.

Figure 1:
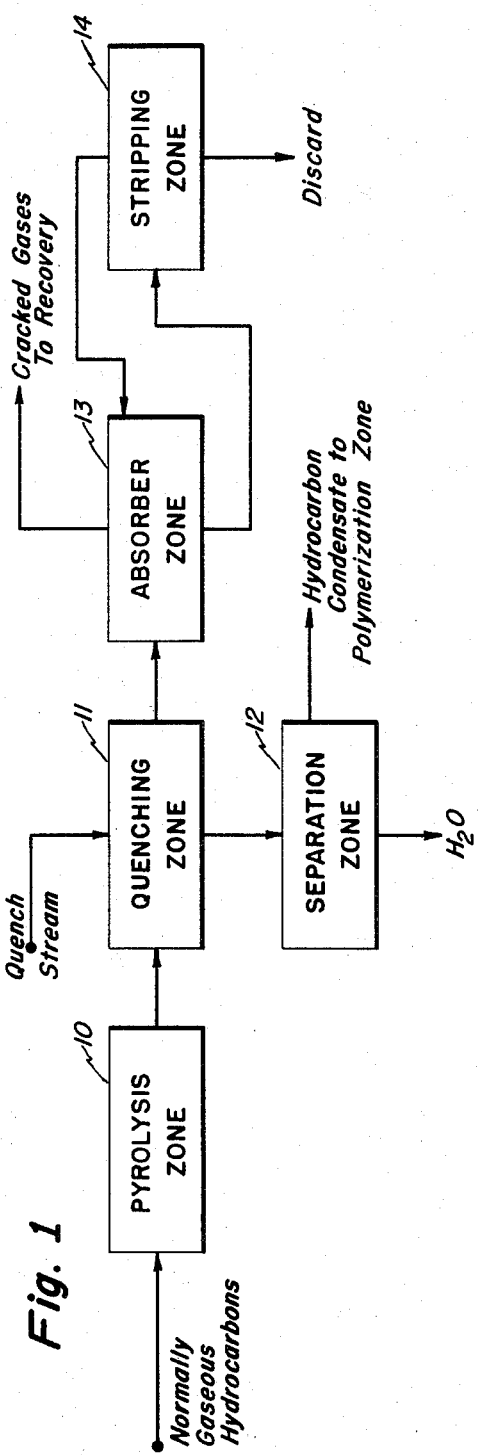
FIGURE 1 is a schematic flowsheet of a process which produces unsaturated hydrocarbon condensate fractions during high temperature pyrolysis of normally gaseous hydrocarbons.

In FIGURE 1 a normally gaseous hydrocarbon, such as ethane, propane, mixtures of ethane and ethylene or propane and propylene, or a natural gas rich in ethane and/or propane is introduced into pyrolysis zone 10 where it is preheated and passed through an alloy tube in a furnace, and exposed at high space velocity to a pyrolysis temperature of at least about 1300° F., preferably between about 1350 and 1550° F. Low or moderately elevated pressures up to about 100 pounds per square inch are ordinarily employed in this operation. The stream of gas should be passed through the furnace at a high velocity, so that the time of exposure to the high temperature is limited to about 0.05 to 5 seconds, around 1 second being preferred. The hot gases leaving the pyrolysis zone 10 are immediately cooled below reaction temperature, preferably below about 100° F. by quenching with a stream of water, oil or other cooling medium in quenching zone 11, whereby further pyrolysis, polymerization or degradation of the reaction product is prevented. From the quenching zone 11, a liquid phase mixture of the cooling medium and unsaturated hydrocarbon is withdrawn and introduced to separation zone 12. The unsaturated hydrocarbon condensate is separated from the quenching liquid by stratification (where the two liquids are immiscible, as from water), or by distillation (as from an absorber oil) and withdrawn from separation zone 12. The yield of this hydrocarbon condensate is ordinarily around 3% by weight of the total quantity of gas charged to the pyrolysis zone 10, the remainder of the gas being converted to lower molecular weight hydrocarbons such as ethylene and methane, and to hydrogen.

After quenching the pyrolysis products a gaseous stream is removed from the quenching zone 11 and this stream of uncondensed vapor is passed to absorber zone 13 where it is raised to a pressure above about 350 p.s.i.g., preferably around 500 p.s.i.g. The compressed stream is then cooled and residual heavy hydrocarbons are condensed. A light absorber oil removes from the compressed gaseous stream the high boiling residue. The absorber oil containing the residue is then passed to stripper zone 14 where the absorber oil is removed and recycled back to absorber 13. After removing the absorber oil the residual hydrocarbons are discarded.

Synthetic hydrocarbon resins useful in this invention are formed by thermal polymerization of the hydrocarbon condensate obtained from separation zone 12. The charging stock employed can be either the total hydrocarbon condensate obtained as described above, or a distillate or bottoms fraction thereof. An especially desirable charging stock is the 15 to 35 percent bottoms fraction, preferably about 25 percent bottoms fraction. A typical specimen of the bottoms fraction has the following properties:

ASTM distillation range, ° F.:
   Initial _____ 176
   10% _____ 223
   30% _____ 270
   50% _____ 325
   70% _____ 351
   90% _____ 378
   Final _____ 563
Gravity, 0 API at 60° F. _____ 21.1
Iodine number (Wijs) _____ 259
Maleic anhydride value, mg. M.A./g. _____ 37.8

Figure 2:
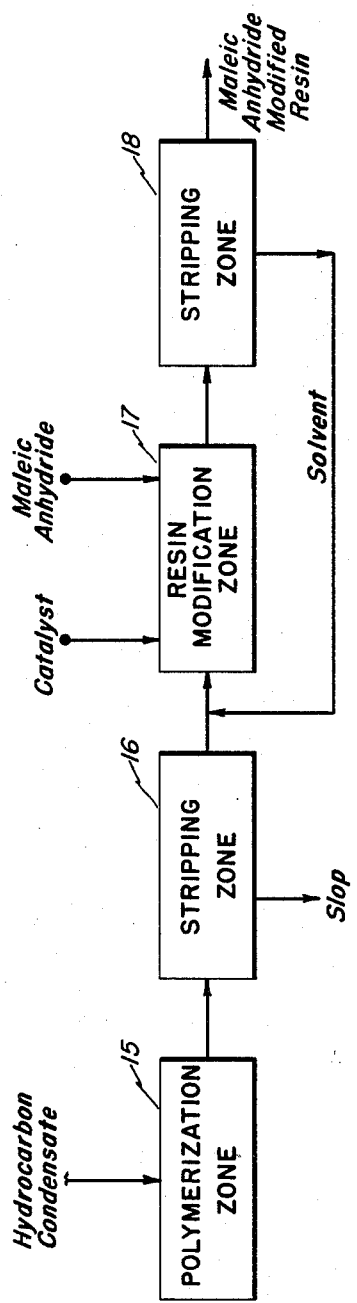
FIGURE 2 is a schematic flowsheet of the process for producing resins of this invention by polymerizing unsaturated hydrocarbon condensates to produce polymers which are modified by reaction with maleic anhydride.

A preferred method of thermally polymerizing the unsaturated hydrocarbon condensate is shown in FIGURE 2. This method consists of charging the bottoms fraction of the above type condensate materials to a polymerization zone 15 containing a reactor equipped with heating and cooling means as well as means for agitating its contents. The temperature within the reactor is raised approximately 100° F. per hour until a temperature of about 250° F. is reached. The reaction system is then vented to remove any traces of water from the charge material. The temperature is then raised to about 450–550° F. over a period of about 6–10 hours thus giving a total heat-up time of about 8–12 hours. The reactor is held at approximately 450–550° F. and under a pressure of about 150 to 400 p.s.i.g. for a period of about 6–16 hours. At the end of this time the reactor contents are cooled to about 400° F. or below. The reaction system is then vented to the atmosphere and the reactor contents passed to stripping zone 16 where it is stripped with steam and natural gas to the desired viscosity or softening point.

The typical properties of resins useful in this invention which are prepared from hydrocarbon condensates as described above together with the properties of hydrocarbon resins produced from hydrocarbon condensates obtained from other pyrolysis processes are shown below.

|  | Thermal Polymerization | | Catalytic Polymerization—Resin C |
|---|---|---|---|
|  | Resin A | Resin B |  |
| Iodine Number | 140–160 | 200–230 | 80–100 |
| Softening Point, °F | 210 | 210 | 210 |
| Acid Number | Nil | Nil | Nil |
| Saponification No | Nil | Nil | Nil |
| Average Molecular Wt | 593 | 688 | 500 |
| Viscosity in Aromatic Solvent (70% solution), Gardner-Holdt | M | P | F |
| Viscosity in Mineral Spirits (60% solution), Gardner-Holdt | Z | Z-1 | Z-5 |

Resin A above was prepared by thermal polymerization of a 25% bottoms fraction of a hydrocarbon condensate obtained from separation zone 12 described above. Resin B above was prepared by thermal polymerization of a heavy hydrocarbon condensate obtained from another type pyrolysis process. Resin C above was prepared by the boron trifluoride-catalyzed polymerization of the heavy hydrocarbon condensate obtained from a third type of pyrolysis process.

The resin product from stripping zone 16 is taken into solution by mixing with a suitable solvent, such as an aromatic hydrocarbon or a mixture of aromatic and paraffin hydrocarbons, preferably toluene or xylene. As an alternate the reactants from polymerization zone 15 may be used directly in further processing, without a stripping step. The resin in solvent solution is then passed to resin modification zone 17 where it is mixed with from 5 to 20% by weight (based upon the resin) of maleic anhydride, preferably about 10% by weight. Peroxide catalyst is added to the reactants in the amount of from 1 to 10% by weight. Any of the usual peroxide catalysts such as ditertiary butyl peroxide or benzoyl peroxide are suitable so long as free radicals are produced at the reaction temperature. The reaction temperature and time are not critical and can vary from 150 to 400° F. and from 1 to 15 hours, preferably a temperature of about 290° F. and a time of about 5 hours are used. The maleic anhydride modified resin in solution is passed from resin modification zone 17 to stripping zone 18 where the solvent is removed and recycled to the resin modification zone for reuse and the modified resin is recovered.

To illustrate the resin modification step the three unsaturated hydrocarbon resins shown in the previous table which are labeled Resins A, B and C, were modified with maleic anhydride in an effort to form improved hydrocarbon resin adducts. These resins were reacted batchwise in a solvent system using xylene as a solvent and ditertiary butyl peroxide as a free radical initiator.

The reactants were mixed in the following proportions:

| | Weight percent |
|---|---|
| Hydrocarbon resin | 43.9 |
| Maleic anhydride | 4.9 |
| Ditertiary butyl peroxide | 2.5 |
| Xylene | 48.7 |

The reactants were charged to a batch reactor and heated to a reflux temperature of about 290° F. and held at this temperature for 5 hrs. 20 minutes. Viscosity measurements were made at one-hour intervals during the reaction time. After the reaction period, the reaction products were stripped of solvent and the maleic anhydride adducts of the hydrocarbon resins were recovered.

The interim viscosities (Gardner-Holdt) together with the final viscosity and acid number of the maleic anhydride adducts prepared from the above three resins according to the foregoing process are shown below:

|  | Adduct of Resin A | Adduct of Resin B | Adduct of Resin C |
|---|---|---|---|
| 1 hour | A–B | A | A |
| 2 hours | F | A | A |
| 3 hours | G | A | A |
| 4 hours | I | A | A |
| 5 hours | K | A | A |
| 5 hrs. 20 min. (cook off) | L | A | A |
| Final | O | A | A–4 |
| Acid Number | 13.0 | 13.0 | 18.5 |

It can be seen from the above table that the maleic anhydride adduct prepared from Resin A has a totally unexpected and different viscosity than those prepared from Resins B or C. Further, when using the free radical-initiated reaction described above satisfactory adducts could not be prepared from Resins B or C. Yet a superior adduct was prepared from Resin A. It should be noted that an adduct of maleic anhydride could not be prepared from any of these three resins using the Diels-Alder reaction. Referring for a moment back to the table showing the properties of the unmodified resins, it is not at all predictable from any of the properties shown that Resin A should act any differently than Resins B or C. Since resins of the unsaturated hydrocarbon type are known to be quite complex and different from one another in their molecular structure, this marked difference in the formation of the adduct by Resin A cannot be easily explained. Possibly, the configuration of the unsaturated bonds in Resin A in some manner permits the maleic anhydride to react by hydrogen transfer in a free radical-initiated system in a manner to give the adduct totally unexpected properties while the double bonds in Resins B and C are arranged in such a manner so as to give the expected reaction with maleic anhydride. The acid number of the adduct of Resin A was well below the theoretical value. This indicates that the acid groups of the reacted maleic anhydride are severely hindered or have reacted with other acid groups. This conclusion was borne out by experiments designed to esterify the reaction products. None of these adducts could be esterified to anything approaching the theoretical value.

The maleic anhydride adduct formed by this invention produces a polycarboxylic acid having a very high softening point and high molecular weight. This upgrades the usefulness of the hydrocarbon resin when incorporated in surface coatings and printing inks so as to effect rapid solvent release and film spread to give quick drying results. These adducts are useful as extenders for alkyd resins where they can be charged to the kettle during the alkyd reaction; as varnish resins in the preparation of cold cut varnishes; as modifiers for tall oil esters where the reaction product can be added together with the tall oil fatty acid in the esterification process; as a size for cellulose fiber products where slight residual acidity will assist bonding; and for use in heat-set and quick-drying printing inks.

Having thus described our invention, what we claim is:
1. The free radical-initiated reaction product of maleic anhydride and a hydrocarbon resin, said product having been produced by the reaction of an essentially non-conjugated olefinic hydrocarbon resin with 5 to 20 weight percent of maleic anhydride in the presence of from 1 to 10 weight percent of a catalyst capable of producing free radicals, at a reaction temperature in the range of 150° F. to 400° F. and for a reaction time in the range of 1 to 15 hours, said olefinic hydrocarbon resin having an iodine number between about 140 and 160, a softening point of about 200° F., an average molecular weight of about 590 and having been produced by the thermal polymerization of an unsaturated hydrocarbon condensate having been obtained from the quenching step in the high temperature pyrolysis of normally gaseous hydrocarbons and having an API gravity of about 20°, an iodine number of about 260 and a maleic anhydride value of about 35 and an ASTM boiling range of 175° F. to about 560° F.

2. The process of producing a maleic anhydride-modified hydrocarbon resin which comprises reacting an unsaturated hydrocarbon resin containing essentially no conjugated double bonds with from 5 to 20 weight percent maleic anhydride in the presence of from 1 to 10 weight percent of a catalyst capable of producing free radicals, at a reaction temperature in the range of about 150 to 400° F. and for a reaction time in the range of about 1 to 15 hours, said unsaturated hydrocarbon resin having an iodine number between 140 and 160, a softening point of about 200° F. and an average molecular weight of about 590, and having been produced by the thermal polymerization of an unsaturated hydrocarbon condensate at a reaction temperature in the range of 450° F. to 550° F. for a reaction time of about 6 to 16 hours and a reaction pressure of about 150 to 400 p.s.i.g., said unsaturated hydrocarbon condensate having been produced in the quenching step of the high temperature pyrolysis of a normally gaseous hydrocarbon and having an API gravity of about 20° and an iodine number of about 260, a maleic anhydride value of about 35 and an ASTM boiling range from about 175° F. to about 560° F.

References Cited in the file of this patent

UNITED STATES PATENTS

| | | |
|---|---|---|
| 2,825,723 | Ballauf | Mar. 4, 1958 |
| 2,871,137 | Aldridge et al. | Jan. 27, 1959 |
| 2,883,367 | Dazzi | Apr. 21, 1959 |
| 2,973,344 | Fasce | Feb. 28, 1961 |

FOREIGN PATENTS

| | | |
|---|---|---|
| 574,913 | Italy | Mar. 28, 1958 |

OTHER REFERENCES

"Polythene," ed. by A. Renfrew et al., London, Iliffe & Sons, Limited 1957, page 22 relied on, TP986 P56 R4 c. 3.